March 1, 1960

G. BURRELL 2,926,972

CRANKSHAFT LUBRICATING MEANS

Filed July 17, 1958

INVENTOR.
Gilbert Burrell
BY
J. L. Carpenter
Attorney

United States Patent Office 2,926,972
Patented Mar. 1, 1960

2,926,972

CRANKSHAFT LUBRICATING MEANS

Gilbert Burrell, Lansing, Mich., assignor to General Motors Corporation, Detroit, Mich., a corporation of Delaware Application July 17, 1958, Serial No. 749,286

5 Claims. (Cl. 308—121)

This invention relates to the lubrication of bearings and journal members and is particularly concerned with improvements in the lubrication of bearings for use in connection with the crankshafts of internal combustion engines.

It is well known to conduct lubricant to the main and journal bearings of internal combustion engine crankshafts in order to lubricate these bearings; however, before starting of these engines and operation of the lube oil pump, most or all of the lubricant in such bearings has drained from the bearings into a suitable sump provided in the crankcase of the engine thereby leaving such bearings relatively unlubricated when it is desired to start the engine. Although the loss of lubrication during initial starting is only momentary, it causes bearing knock between the time the engine is started and oil is supplied from the oil pump and often results in excessive wear of the bearings, overheating, and possible burning which reduces the life of the bearings and thereby involves frequent replacement or repair.

One of the main purposes of the present invention is to see that lubricant is present for lubricating such bearings at all times so that upon and during starting of the engine these bearings will be properly lubricated to eliminate bearing knock and protect against excessive wear, burning, etc. This object has been accomplished by the addition of radially disposed circumferentially spaced pockets which are open to the bearing surfaces between the bearing and the journal so that oil will be stored in these pockets when the engine is not operating and is thereby immediately available on starting of the engine. By placing the pockets in the journal the oil collected in the upper pockets thereof upon turning of the journal will be centrifuged to the bearing surfaces and thereby effect lubrication thereof.

For a fuller understanding of this invention and the objects thereof, reference may be made to the specification taken in conjunction with the drawing in which.

Figure 1:
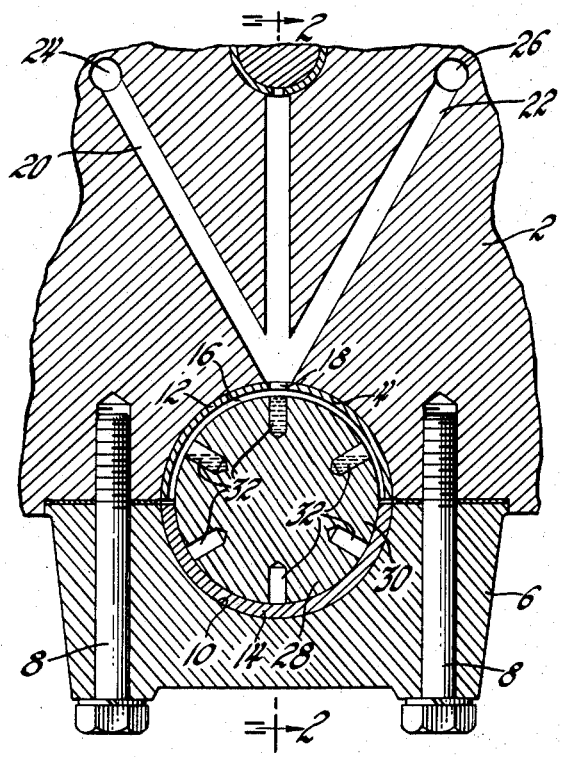
Figure 1 is a transverse sectional view of a portion of an internal combustion engine through one of the main bearings thereof.
Figure 2:
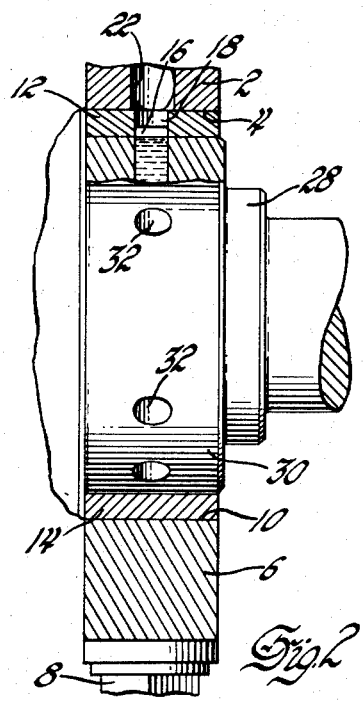
Figure 2 is also a sectional view in elevation taken substantially on the line 2—2 of Figure 1.

Referring now to the drawing, an internal combustion engine is shown which includes a portion of an engine block 2 having an upper bearing recess 4 provided therein. A lower bearing support 6 is secured to the block 2 by studs 8 and is provided with a lower bearing recess 10. Located in the upper and lower bearing recesses 4 and 10, respectively, are upper and lower bearing shells 12 and 14. The upper bearing shell 12 is provided with a circumferentially extending channel 16 in the inner surface thereof which extends from end to end of the upper bearing shell. The upper shell is also provided with a port 18 extending therethrough and in communication with the channel 16. A pair of diagonally substantially vertically extending grooves 20 and 22 lead from a pair of oil galleries 24 and 26 extending longitudinally in the engine block to the port 18. These galleries 24 and 26 conduct lubricant longitudinally of the engine in a conventional manner. Journaled for rotation in the bearing shells 12 and 14 is a crankshaft 28 including the main journal 30. The journal 30 is provided with a plurality of circumferentially spaced radially extending pockets 32 which open to the bearing surfaces between the journal and the bearing and which extend radially toward the axis of the journal. It will be observed that a sufficient number of these pockets are provided so that at least one communicates with the bearing surfaces between the journal and bearing members above the axis of the bearing and journal at all times. In this way no matter when or how the engine is stopped a certain amount of lubricant will be trapped or captured in one or more of these pockets. If the engine is subsequently started the oil previously trapped will immediately be centrifuged to the bearing surfaces thereby providing immediate lubrication for these surfaces.

I claim:

1. In combination with a bearing assembly including a bearing member and a journal member, lubrication means for the bearing surfaces therebetween comprising lubricant conductant means in the form of passages leading to the bearing surfaces between said members and a plurality of circumferentially spaced lubricant storage pockets in said journal member and open to said surfaces adapted to collect lubricant from said surfaces for storage therein when said journal is at rest.

2. A lubricated bearing and journal assembly comprising a bearing rotatably supporting a journal therein and having a lubricant conductant passage leading to the bearing surface thereof, said journal having a plurality of circumferentially spaced pockets open to said surface to collect oil therein adapted to be centrifuged to said surface upon rotation of said journal from rest.

3. In combination with a radial bearing and journal assembly normally disposed so that the axis thereof lies in a generally horizontal plane and including a bearing member and a journal member rotatably supported by said bearing member, lubrication means for the bearing surfaces between said members comprising lubricant conductant means in the form of passages leading to said surfaces, and a plurality of circumferentially spaced lubricant storage pockets in said journal member and open to said surfaces, there being at least one of said pockets open to said surfaces above said axis regardless of the relative rotational position of said members so that lurbicant is available to be centrifuged to said surfaces upon initiation of rotation of between said journal members.

4. In combination, a bearing divided into upper and lower bearing shells, said shells being of semi-cylindrical structure, relative separable upper and lower bearing housings having bearing seating surfaces adapted to receive said shells, means for securing said shells and housings in assembly position with the shells providing an inner bearing surface for a shaft, the upper bearing shell having a centrally located channel in the inner bearing surface thereof extending a plane transverse to the bearing axis and being continuous from end to end of said bearing surface, means for supplying lurbicant to said channel, a shaft journaled in said bearing shells and having an outer bearing surface associated with the inner bearing surface of said shells, and a plurality of radially extending circumferentially spaced pockets extending from the outer bearing surface of said shaft toward the center thereof at least one of which is in open communication with said channel at all times.

5. In an internal combustion engine having a rotatable crankshaft, the combination comprising a bearing journal having a plurality of radially extending circumferentially spaced pockets extending from the outer surface thereof toward the axis thereof, a bearing for said journal and a bearing support, said bearing support and said bearing having lubricant conducting passageways leading to the bearing surfaces between said bearing and journal, the upper portion of said bearing having a circumferentially extending channel above the axis of said bearing and journal in communication with said passageways and in communication with at least one of said pockets at all times.

References Cited in the file of this patent

UNITED STATES PATENTS

| | | |
|---|---|---|
| 1,289,903 | Pogue | Dec. 31, 1918 |
| 1,922,707 | Newcomb | Aug. 15, 1933 |
| 2,004,506 | Moffitt | June 11, 1935 |
| 2,253,416 | Caldwell | Aug. 19, 1941 |
| 2,428,602 | Yingling | Oct. 7, 1947 |
| 2,723,003 | Antonsen | Nov. 8, 1955 |

UNITED STATES PATENT OFFICE
CERTIFICATE OF CORRECTION

March 1, 1960

Patent No. 2,926,972

Gilbert Burrell

It is hereby certified that error appears in the printed specification of the above numbered patent requiring correction and that the said Letters Patent should read as corrected below.

Column 2, line 59, after "extending" insert -- in --.

Signed and sealed this 13th day of September 1960.

(SEAL)
Attest:

KARL H. AXLINE
Attesting Officer

ROBERT C. WATSON
Commissioner of Patents